(12) United States Patent
Masumi (10) Patent No.: US 6,643,350 B2
(45) Date of Patent: Nov. 4, 2003

(54) FUEL ASSEMBLY

(75) Inventor: Ryoji Masumi, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/112,861

(22) Filed: Apr. 2, 2002

(65) Prior Publication Data

US 2002/0097828 A1 Jul. 25, 2002

Related U.S. Application Data

(62) Division of application No. 09/335,694, filed on Jun. 18, 1999, now Pat. No. 6,434,210.

(30) Foreign Application Priority Data

Jul. 1, 1998 (JP) ............................................ 10-185912

(51) Int. Cl.[7] ................................................ G21C 3/00
(52) U.S. Cl. ...................... 376/435; 376/434; 376/443; 376/444; 376/439
(58) Field of Search .............................. 376/434, 435, 376/444, 447, 439

(56) References Cited

U.S. PATENT DOCUMENTS

| | | | |
|---|---|---|---|
| 4,767,595 A | 8/1988 | Wolters, Jr. et al. | 376/353 |
| 4,863,680 A | 9/1989 | Sakurada et al. | 376/444 |
| 5,176,877 A | 1/1993 | Nakajima et al. | 376/435 |
| 5,198,186 A | 3/1993 | Ogiya et al. | 376/435 |
| 5,267,291 A | 11/1993 | Matzner et al. | 376/442 |
| 5,345,486 A | 9/1994 | Reese | 376/443 |
| 5,432,829 A | 7/1995 | Aoyama et al. | 376/434 |
| 5,519,746 A | 5/1996 | Dalke et al. | 376/434 |
| 5,544,211 A | 8/1996 | Haikawa et al. | 376/435 |
| 5,995,577 A | 11/1999 | Matzner | 376/435 |

FOREIGN PATENT DOCUMENTS

| | | |
|---|---|---|
| JP | 64-31091 | 2/1989 |
| JP | 8-285977 | 11/1996 |

*Primary Examiner*—Michael J. Carone
*Assistant Examiner*—Jack Keith
(74) *Attorney, Agent, or Firm*—Mattingly, Stanger & Malur, P.C.

(57) ABSTRACT

A fuel assembly attains high burnup and increases reactor shut-down margin when loaded into a reactor core wherein a water gap width on a control rod side and a water gap width on a side opposite to the control rod side are almost equal to each other. The fuel assembly has a plurality of fuel rods arranged in a square lattice pattern, each fuel rod being filled with nuclear fuel pellets and also has at least one neutron moderator rod shifted toward one corner where a control rod is inserted, away from a cross sectional center of the fuel assembly.

2 Claims, 8 Drawing Sheets

FUEL ASSEMBLY

This is a divisional application of U.S. Ser. No. 09/335,694, filed Jun. 18, 1999, now U.S. Pat. No. 6,434,210.

BACKGROUND OF THE INVENTION

The present invention relates to a fuel assembly for a boiling water reactor (BWR). In particular, the invention is concerned with a fuel assembly suitable for being loaded into a reactor core wherein a water gap width on a side (control rod side) where a control rod is inserted and a water gap width on a side (opposite to the control rod side) where a control rod is not inserted, are almost equal to each other. This type of core is usually called a "C-lattice core".

Recently, in a light water reactor (LWR), improvement in fuel economy and reduction of spent fuel (reduction in the number of fuel assemblies discharged from the reactor and reduction in the amount of spent fuel) have received considerable attention. To this end, it is effective to enhance discharge burn-up (high burnup) of fuel assemblies.

For the high burnup, it is necessary to increase uranium enrichment which means uranium-235 enrichment. The increase in uranium enrichment causes an increase in the hot-to-cold reactivity swing and a decrease in the reactor shut-down margin. The hot-to-cold reactivity swing is a reactivity difference of the reactor between a hot operating condition and a cold shut-down condition.

In addition, the increase in uranium enrichment causes an increase in the exposure (burnup) difference between fuel assemblies due to a residence (loaded) period difference in a reactor core. This increase in the exposure difference causes an increase in the maximum thermal power (or channel peaking factor) of fuel assemblies and a decrease in thermal margin. The thermal margin is a difference between an operating limit of thermal power and an actual maximum thermal power in an operating condition.

Japanese Laid-open No. Hei 8-285977 describes a short-length (part-length) fuel rod containing a burnable absorber, which absorbs thermal neutrons causing the nuclear reaction and is disposed at a corner position in the second layer from the outside of a fuel assembly to thereby enhance the thermal margin while attaining high burnup.

Japanese Laid-open No. Sho 64-31091 describes a fuel assembly for being loaded into a D-lattice core wherein a water gap width on a control rod side is larger than that on an opposite side, wherein an inner water gap is formed to increase the reactor shut-down margin, and the inner water gap or a water rod is shifted toward the side opposite to the control rod side to ensure the thermal margin.

However, in JP 8-285977, no consideration is given to improving of the reactor shut-down margin, and in JP 64-31091, a fuel assembly is disclosed that has a D-lattice core. Accordingly, no consideration is given to a fuel assembly for a reactor core wherein the water gap width on the control rod side and that on the opposite side are almost equal to each other.

SUMMARY OF THE INVENTION

It is a first object of the present invention to provide a fuel assembly which, when loaded into a reactor core wherein the control rod-side water gap width and the opposite-side water gap width are almost equal to each other, can attain high burnup and an increase in the reactor shut-down margin.

It is a second object of the present invention to provide a fuel assembly which can achieve the above first object and can also increase the thermal margin.

In accordance with the present invention, a fuel assembly is suitable to be loaded into a reactor core that has a control rod-side water gap width and an opposite-side water gap width that are almost equal to each other.

The fuel assembly has a plurality of fuel rods arranged in a square lattice pattern, each fuel rod being filled with nuclear fuel pellets and also has at least one neutron moderator rod shifted toward one corner where a control rod is inserted away from a cross sectional center of the fuel assembly. That is, a center of the at least one neutron moderator rod is shifted toward one corner where a control rod is inserted with respect to the cross sectional center of the fuel assembly.

In accordance with the present invention, a fuel assembly has a fuel bundle having a plurality of fuel rods arranged in a square lattice pattern and at least one neutron moderator rod, each fuel rod being filled with nuclear fuel pellets. An upper tie plate and a lower tie plate hold upper end portions and lower end portions of the fuel rods respectively. A channel box covering the fuel bundle is fixed to one corner of the upper tie plate by a channel fastener. A center of the at least one neutron moderator rod is shifted toward the one corner from a cross sectional center of the fuel assembly.

Preferably, the plurality of fuel rods include a plurality of short-length (part-length) fuel rods having a shorter active fuel length than the remaining fuel rods and the number of the short-length fuel rods are arranged in one diagonally divided half area opposite to the one corner that is larger than that in the other diagonally divided half area.

Further, preferably, at least one of the short-length fuel rods is disposed at a position adjacent to the at least one neutron moderator rod on a side opposite to the one corner.

Preferably also, the fuel assembly is divided into a first region including the one corner and a second region by a diagonal line in a cross section, and an average uranium enrichment of the fuel rods in the second region is higher than that of the fuel rods in the first region.

Still further, preferably, the plurality of fuel rods include a plurality of burnable absorber-filled fuel rods added burnable absorber thereto and the number of said burnable absorber-filled fuel rods being arranged in one diagonally divided half area opposite to said one corner is larger than that in the other diagonally divided half area.

In accordance with a preferred embodiment of the present invention, a fuel assembly has a plurality of fuel rods arranged in a square lattice of 10-rows by 10-columns for each fuel rod being filled with nuclear fuel pellets and also has one water rod disposed in an area of 3-rows by 3-columns in the square lattice. A center of the one water rod is shifted toward one corner where a control rod is inserted with respect to a cross sectional center of the fuel assembly.

Also, in accordance with a preferred embodiment of the present invention, a fuel assembly has a fuel bundle having a plurality of fuel rods arranged in a square lattice of 10-rows by 10-columns and one water rod disposed in an area of 3-rows by 3-columns in said square lattice, each fuel rod being filled with nuclear fuel pellets and an upper tie plate and a lower tie plate holding upper end portions and lower end portions of the fuel rods respectively. A channel box covering the fuel bundle is fixed to one corner of the upper tie plate by a channel fastener. A center of the one water rod is shifted toward the one corner with respect to a cross sectional center of the fuel assembly.

As a result of the present invention, since the at least one neutron moderator rod (or one water rod) is shifted toward one corner (the control rod side and the channel fastener side), where the control rod is inserted and the channel fastener is fixed, from a cross sectional center of the fuel assembly, thermal neutron flux of one diagonally divided half area opposite to the one corner becomes higher than that of the other diagonally divided half area.

Therefore, the control rod worth, which means the ability of the control rod to control the nuclear reaction depending on the thermal neutron flux, can be enhanced in comparison with the case where a center of the neutron moderator rod is disposed at a center of the fuel assembly or shifted toward the other corner opposite to the one corner. The enhancement of the control rod worth contributes to an increase in the reactor shut-down margin while attaining the high burnup.

Furthermore, since the short-length fuel rods are disposed in a larger number on a side opposite to the channel fastener side than on the channel fastener side, moderator (water) distribution on both sides becomes almost uniform over the cross section of the fuel assembly in an upper region above the upper end of the short-length fuel rods when the reactor is in a hot operating condition. This moderator distribution contributes to the flattening of local power distribution.

In addition, it is possible to decrease a rise in reactivity because neutron flux is over-moderated based on a great increase in water density on the opposite side in the upper region above the upper end of the short-length fuel rods when the reactor is in a cold shut-down condition. This decrease in the reactivity contributes to an increase in the thermal margin.

Furthermore, since at least one of the short-length fuel rods is disposed at a position adjacent to the at least one neutron moderator rod on the side opposite to the one corner, it is possible to decrease an absolute value of the void coefficient.

Furthermore, since the average uranium enrichment in the first region where the thermal neutron flux becomes relatively high under the influence of the at least one neutron moderator rod is set low and the average uranium enrichment in the second region where the thermal neutron flux becomes relatively low is set high, the moderator distribution can be made flatter in the hot operating condition and it is possible to further increase the thermal margin.

Furthermore, since the thermal neutron flux on the channel fastener side increases relatively under the influence of the burnable absorber-filled fuel rods arranged in a larger number on a side opposite to the channel fastener side, it is possible to further enhance the control rod worth and further increase the reactor shut-down margin.

In addition, since the burnable absorber-filled fuel rods are disposed in a larger number on the opposite side where the thermal neutron flux is relatively low, the effect of the burnable absorber is maintained for a long period. This long period effect is suitable for a long-term cycle operation of the reactor.

DESCRIPTION OF THE PREFERRED EMBODIMENTS

Embodiments of the present invention are described in detail hereinafter with reference to the accompanying drawings.

(Embodiment 1)

A fuel assembly according to the first embodiment of the present invention is described with reference to FIGS. 1 and 2. The fuel assembly of this embodiment is loaded into a reactor core wherein a water gap width on a control rod side (control rod-side water gap width) and that on a side opposite to the control rod side (opposite-side water gap width) are almost equal to each other.

Figure 1:
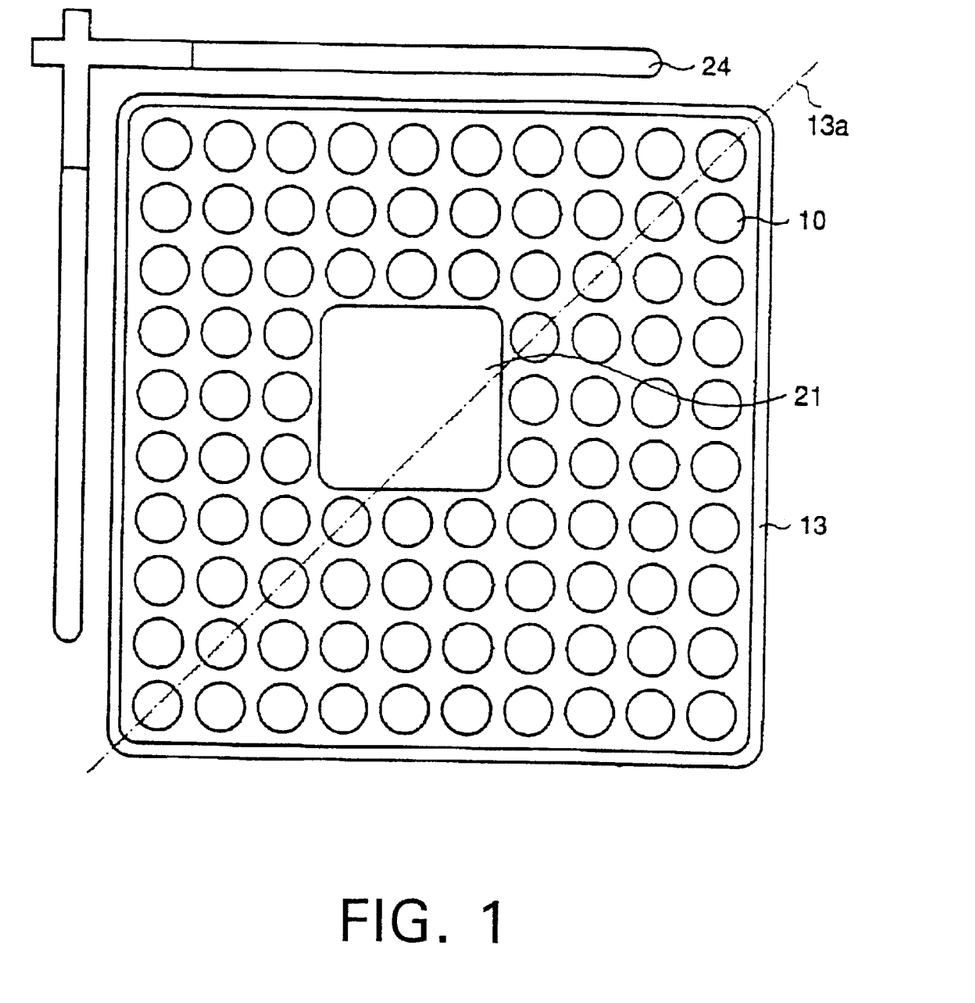
FIG. 1 is a cross sectional view of a fuel assembly according to the first embodiment of the present invention.
Figure 2:
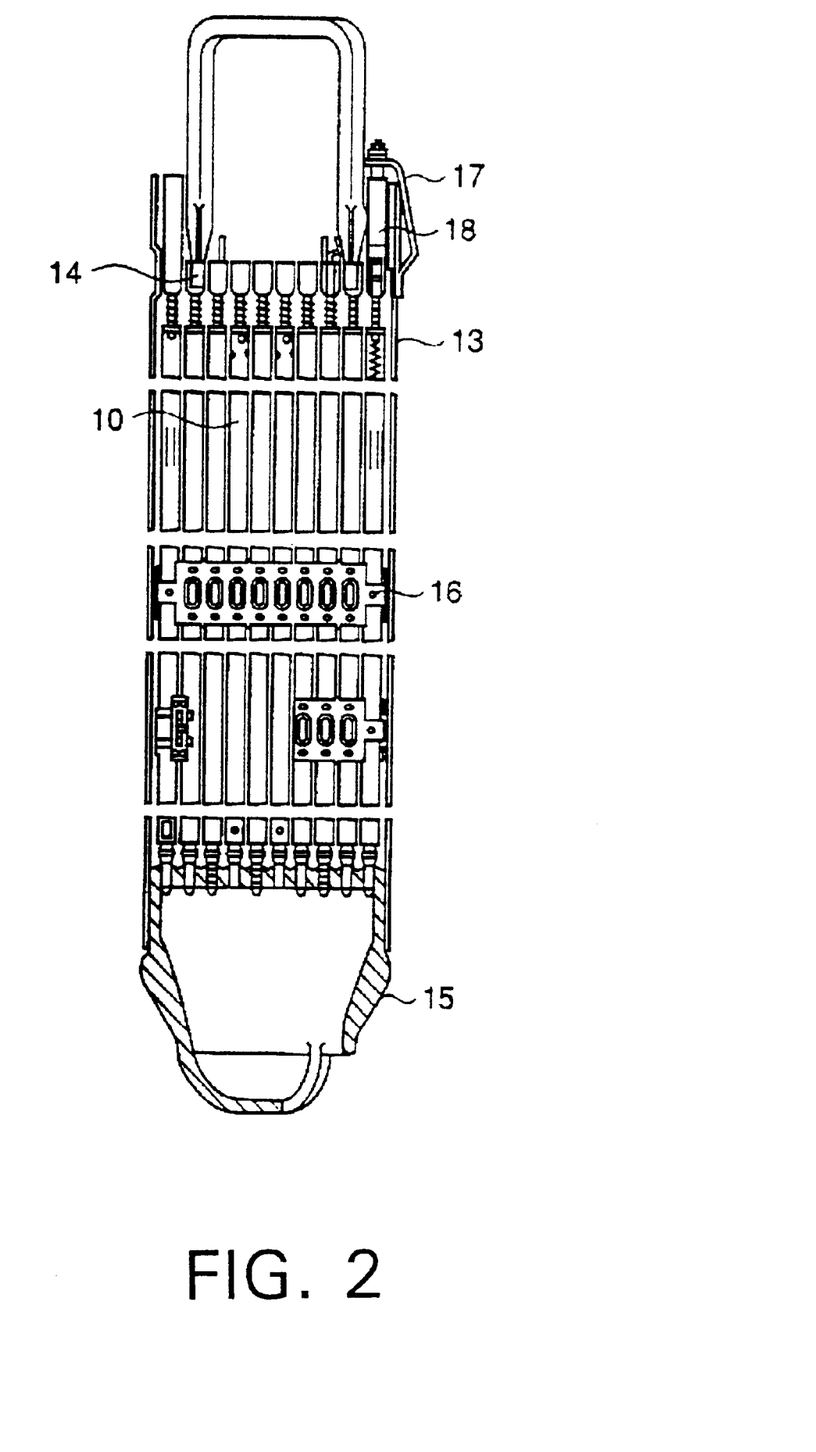
FIG. 2 is a schematic longitudinal sectional view thereof.

FIG. 1 is a cross sectional view of the fuel assembly and FIG. 2 is a schematic longitudinal sectional view thereof. As shown in FIG. 2, the fuel assembly has a fuel bundle (without a symbol), an upper tie plate 14, a lower tie plate 15 and a channel box 13. The fuel bundle has a plurality of fuel rods 10, one water rod 21 (not shown in FIG. 1) and a plurality of spacers 16.

The channel box 13 has a square pipe shape and covers the fuel bundle from the outside. The upper tie plate 14 and the lower tie plate 15 hold upper end portions and lower end portions of the fuel rods 10, respectively. The spacers 16 are disposed axially at predetermined certain intervals for holding spaces between the fuel rods 10.

As shown in FIG. 1, ninety-one fuel rods 10 are arranged in a square lattice of 10 rows by 10 columns (10×10) and one water rod 21 of a square pipe shape is disposed in a central region of 3 rows by 3 columns (3×3). Nine fuel rods 10 can be disposed in this central region. Each fuel rod 10 has a zircalloy clad tube packed with nuclear fuel pellets formed by a dioxide of enriched uranium.

As shown in FIG. 1, if the fuel assembly is divided into a control rod side and a side (anti-control rod side) opposite to the control rod side by a diagonal line 13a, the water rod 21 is shifted toward the control rod side. In other words, a center of the water rod 21 is shifted toward the one where the control rod 24 is inserted, away from a cross sectional center of the fuel assembly.

As shown in FIG. 2, the channel box 13 is fixed to the fuel bundle by fixing a channel fastener 17 to a corner post 18 that is attached to the upper tie plate 14 at the one corner where the control rod 24 is inserted. Thus, the aforementioned control rod side corresponds to the channel fastener side or the corner post side.

In this embodiment, since the water rod 21 is shifted toward the control rod side (channel fastener side, corner post side), thermal neutron flux near the control rod 24 increases and hence it is possible to enhance the control rod worth. Therefore, in comparison with a case where the water rod is disposed at the center of the fuel assembly or shifted toward a side opposite the control rod side, the reactor shutdown margin can be increased while attaining higher burnup of the fuel assembly. As a result, it is possible to improve the fuel economy and decrease the amount of spent fuel.

(Embodiment 2)

Figure 3:
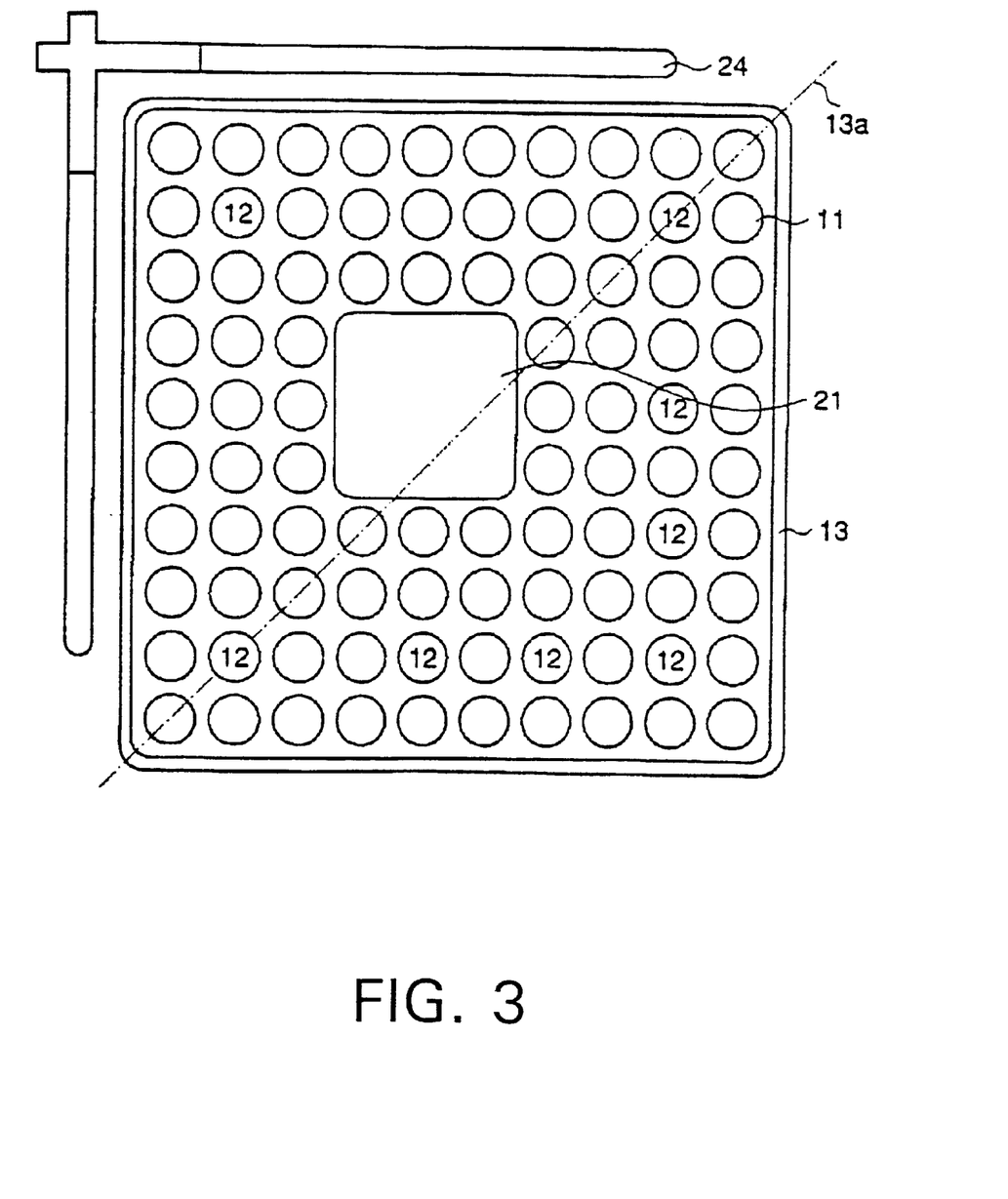
FIG. 3 is a cross sectional view of a fuel assembly according to the second embodiment of the present invention.

A fuel assembly according to the second embodiment of the present invention is described with reference to FIG. 3. FIG. 3 is a cross sectional view of the fuel assembly. This second embodiment is different from the first embodiment in that two types of fuel rods are used that have different active fuel lengths. The active fuel length is the length of the portion of the fuel rod packed with nuclear fuel pellets.

More specifically, one type of fuel rod is a long-length (full-length) fuel rod 11 having a relatively large active fuel length and the other type of fuel rod is a short-length (part-length) fuel rod 12 having an active fuel length about 15/24 that of the long-length fuel rod 11. As shown in FIG. 3, eight short-length fuel rods 12 are disposed in the second layer from the outside of the fuel assembly. One of them is disposed on the control rod side and five are disposed on the side opposite to the anti-control rod side.

In this embodiment, it is possible to increase the reactor shut-down margin as in the first embodiment. In addition, this embodiment attains the following effect.

The short-length fuel rods generally contribute to a flattening of the moderator (water) distribution in an axial direction of the fuel assembly. In this embodiment, since the short-length fuel rods 12 are disposed in a larger number on the side opposite to the control rod side than on the control rod side, it is also possible to flatten the moderator distribution in a cross section of the fuel assembly.

These effects contribute to flattening of the local power distribution and to a decrease in the rise of reactivity when the reactor is in a cold shut-down condition. As a result, the thermal margin can be increased.

(Embodiment 3)

Figure 4:
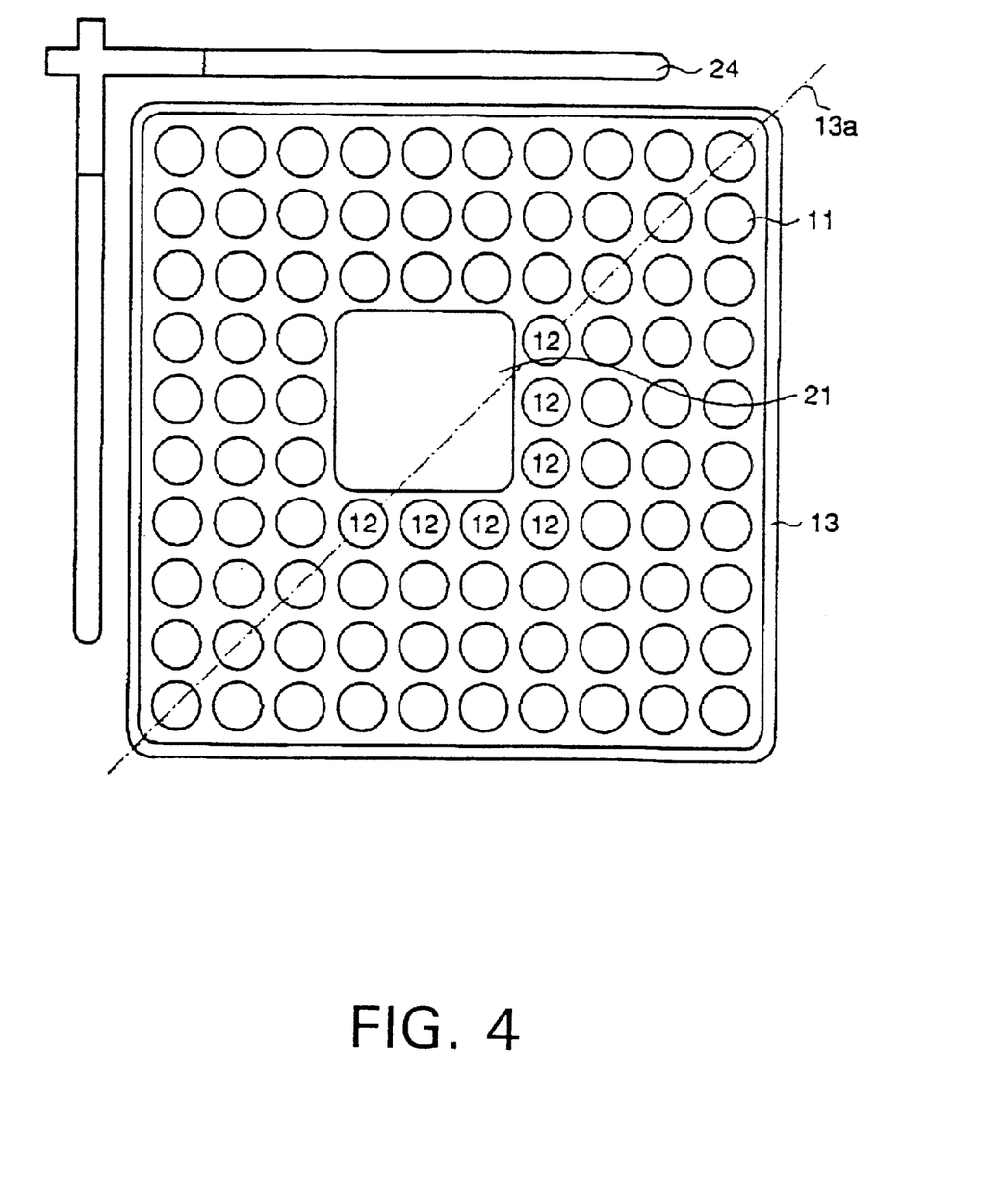
FIG. 4 is a cross sectional view of a fuel assembly according to the third embodiment of the present invention.

A fuel assembly according to the third embodiment of the present invention is described with reference to FIG. 4. FIG. 4 is a cross sectional view of the fuel assembly. In this embodiment, short-length fuel rods 12, arranged separately in the second embodiment, are concentrated around a water rod 21 of a square pipe shape.

More specifically, seven short-length fuel rods 12 are disposed at positions adjacent to the water rod 21 on the side opposite to the control rod side. Five of the short-length fuel rods 12 are disposed in a half area on the side opposite to the control rod side with respect to the diagonal line 13a.

In this embodiment, an increase in the reactor shut-down margin and an increase in the thermal margin by flattening the local power distribution can also be attained as in the second embodiment.

In addition, in this embodiment, a satisfactory moderation of neutrons is attained independently of the void fraction of the water (moderator) in the channel box 13 like a case that a cross sectional area of the water rod 21 increases effectively. Therefore, it is also possible to decrease an absolute value of the void coefficient.

(Embodiment 4)

Figure 5:
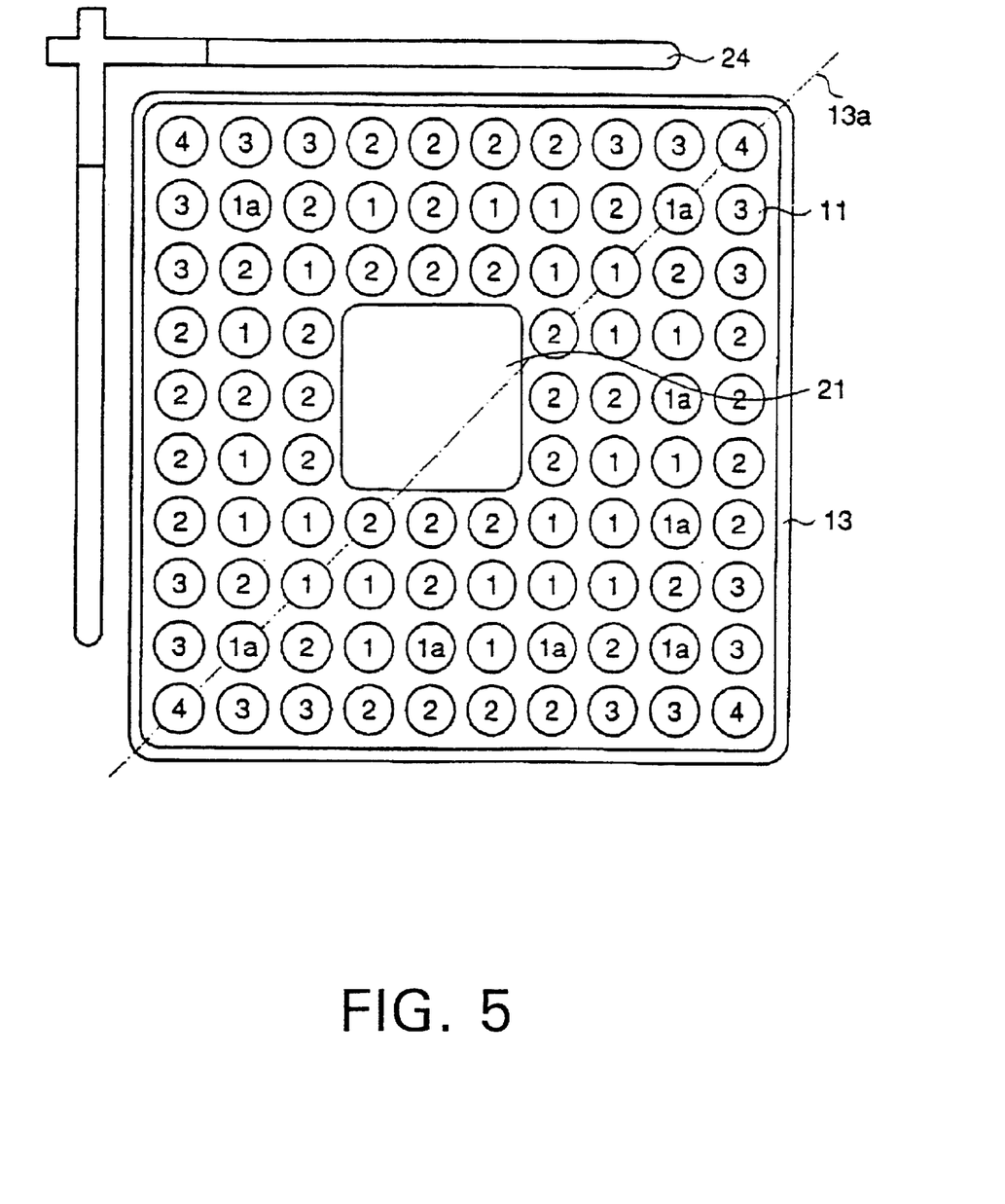
FIG. 5 is a cross sectional view of a fuel assembly according to the fourth embodiment of the present invention.

A fuel assembly according to the fourth embodiment of the present invention is described with reference to FIG. 5. FIG. 5 is a cross sectional view of the fuel assembly. In this embodiment, which is a modification of the second embodiment, a certain improvement is made with respect to distribution of an average uranium enrichment (hereinafter referred to simply as "enrichment") of the fuel rods.

More specifically, four types of long-length fuel rods with different enrichment are used, which include a fuel rod 1 of about 5 wt % (highest) enrichment, a fuel rod 2 of about 4 wt % enrichment, a fuel rod 3 of about 3 wt % enrichment, and a fuel rod 4 of about 2 wt % (lowest) enrichment.

A fuel rod 1a can be the same short-length fuel rod as in the second embodiment and its enrichment is about 5 wt % (highest). Other constructional points are the same as in the second embodiment and therefore explanations thereof are omitted here.

As shown in FIG. 5, the fuel rods 4 of the lowest enrichment are disposed at four corners of the outermost layer and the fuel rods 3 of the second lowest enrichment are disposed at positions close to the corners in the outermost layer.

Fuel rods 2 of the second highest enrichment are disposed at positions adjacent to the water rod 21 in the row or column direction (vertical or transverse direction in FIG. 5). Further, fuel rods 1 of the highest enrichment are disposed at positions adjacent obliquely to the water rod 21.

In a cross section perpendicular to an axis of the fuel assembly, the average enrichment of the fuel rods in one half area (hereinafter referred to as "opposite the control rod side area") on the opposite the control rod side that is divided by the diagonal line 13a is higher than that of the fuel rods in the other half area (hereinafter referred to as the "control rod side area") on the control rod side.

In this embodiment, the same effect as in the second embodiment can be obtained. In addition, in this embodiment, since the average enrichment in the opposite to the control rod side area, where thermal neutron flux is relatively low, is set higher than that in said the control rod side area, the local power distribution can be flattened more effectively.

(Embodiment 5)

Figure 6:
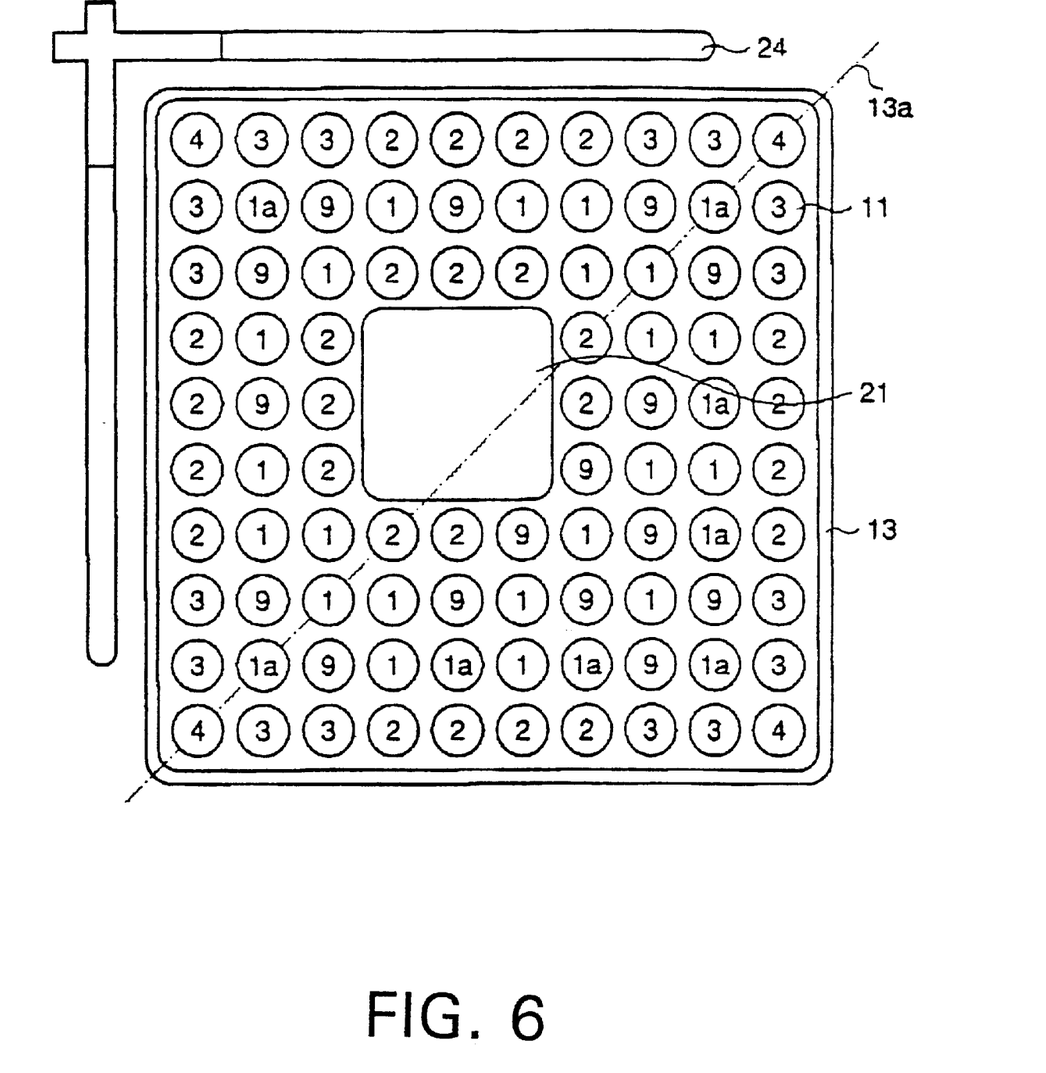
FIG. 6 is a cross sectional view of a fuel assembly according to the fifth embodiment of the present invention.

A fuel assembly according to the fifth embodiment of the present invention is described with reference to FIG. 6. FIG. 6 is a cross sectional view of the fuel assembly. In this embodiment, which is a modification of the fourth embodiment, a certain improvement is made with respect to an arrangement of gadolinia-filled fuel rods (hereinafter called "Gd fuel rods"). Gadolinia is one of burnable absorber.

The Gd fuel rod 9 has an average uranium enrichment of about 4 wt % and an average gadolinia concentration of about 5 wt %. Sixteen Gd fuel rods 9 are arranged in the fuel assembly. Ten of them are disposed in the anti-control rod side area and six are disposed in the control rod side area.

In the second layer from the outside of the fuel assembly, the Gd fuel rods 9 are disposed at eight positions adjacent to the fuel rods 1a (the short-length fuel rods of the highest enrichment) located at corner positions. Other constructional points are the same as in the second embodiment and therefore explanations thereof are omitted here.

This embodiment also brings about the same effect as in the fourth embodiment. In addition, in this embodiment, since the Gd fuel rods are disposed in a larger number in the opposite the control rod side area, a larger number of neutrons are absorbed in the opposite the control rod side area than in the control rod side area.

As a result, the thermal neutron flux in the control rod side area can be increased relatively and hence it is possible to enhance the control rod worth and increase the reactor shut-down margin in comparison with the fourth embodiment.

(Embodiment 6)

Figure 7:
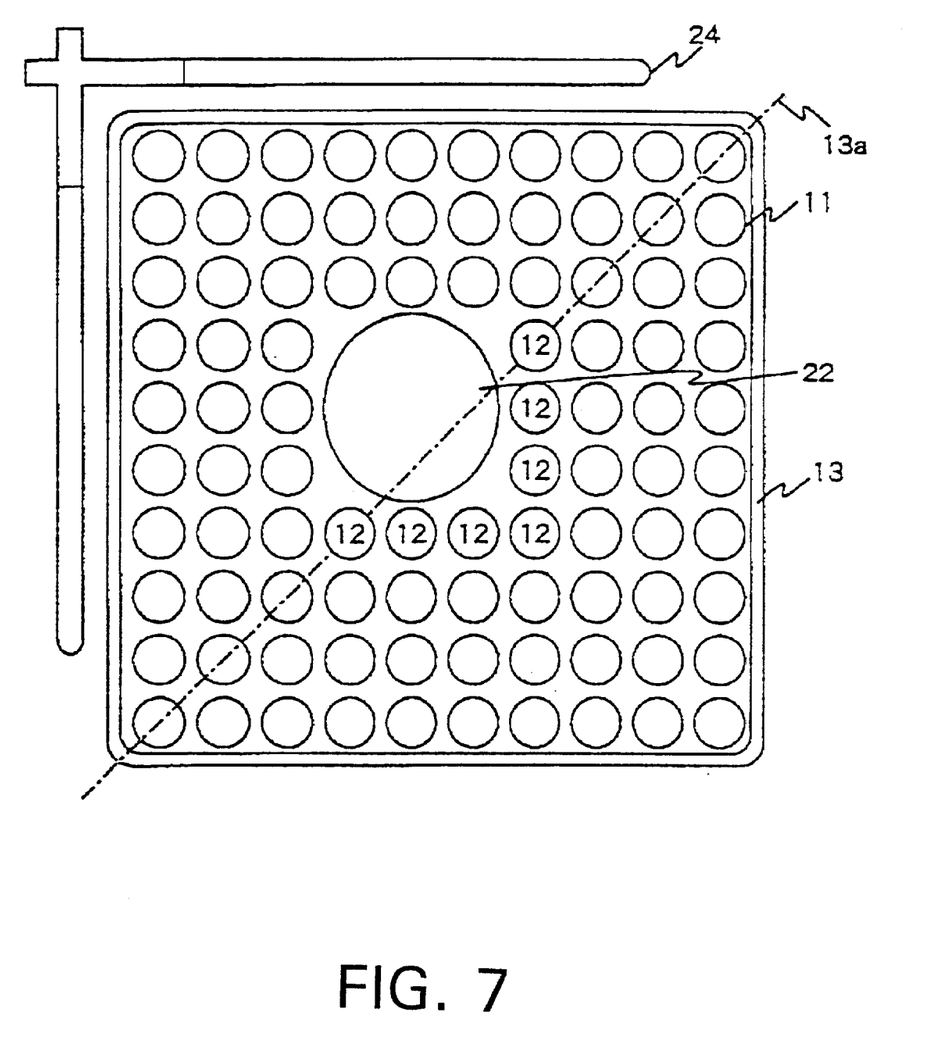
FIG. 7 is a cross sectional view of a fuel assembly according to the sixth embodiment of the present invention.

A fuel assembly according to the sixth embodiment of the present invention is described with reference to FIG. 7. FIG. 7 is a cross sectional view of the fuel assembly. In this embodiment, one cylindrical water rod 22 is disposed in the 33 central region instead of the water rod 21 in the third embodiment shown in FIG. 4.

A cross sectional area of the water rod 22 is smaller than that of the water rod 21. Other constructional points are the same as in the third embodiment and therefore explanations thereof are omitted here.

This embodiment also brings about the same effect as in the third embodiment. In addition, in this embodiment, since the cross sectional area of the water rod is set smaller than that in the third embodiment, wasteful absorption of neutrons by the water rod when the reactor is in a hot operating condition can be reduced. Therefore, it is possible to improve the neutron economy more than in the third embodiment.

(Embodiment 7)

Figure 8:
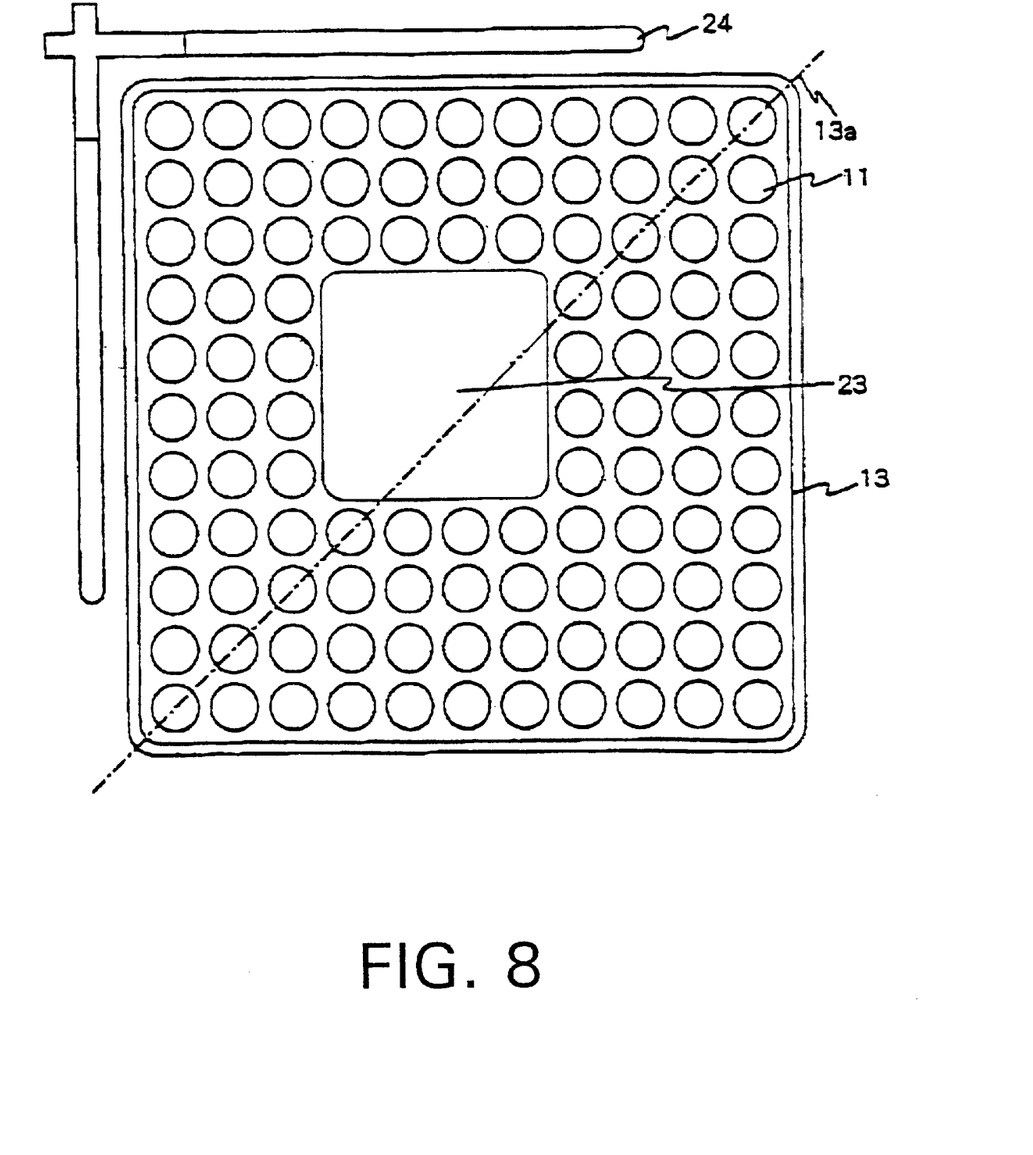
FIG. 8 is a cross sectional view of a fuel assembly according to the seventh embodiment of the present invention.

A fuel assembly according to the seventh embodiment of the present invention is described with reference to FIG. 8. FIG. 8 is a cross sectional view of the fuel assembly. In this embodiment, which is a modification of the first embodiment shown in FIG. 1, the number of fuel rods is increased for the purpose of attaining higher burnup than in the first embodiment.

That is, one hundred and five fuel rods 11 are arranged in a square lattice of 11 rows by 11 columns (11×11) and one water rod 23 of a square pipe shape is disposed in a central region of 4 rows by 4 columns (4×4). Sixteen fuel rods can be disposed in this central region.

As shown in FIG. 8, if the fuel assembly is divided into the control rod side and the opposite the control rod, the water rod 23 is shifted toward the control rod side. Therefore, this embodiment also brings about the same effect as in the first embodiment.

Although one water rod is used in the above embodiments, there also may be used a plurality of water rods. In this case, if the water rods are shifted toward one corner where a control rod is inserted from a cross sectional center of the fuel assembly, the same effects as in the above embodiments can be obtained.

Further, although enriched uranium is used as the nuclear fuel in the above embodiments, there also may be used a nuclear fuel obtained by replacing a portion or the whole of enriched uranium with plutonium-enriched uranium. In this case, the same effects as in the above embodiments can be obtained.

What is claimed is:

1. A fuel assembly for being loaded into a reactor core wherein a control rod-side water gap width and an opposite-side water gap width are almost equal to each other, comprising:

a fuel bundle having a plurality of fuel rods arranged in a square lattice pattern and at least one neutron moderator rod, each fuel rod being filled with nuclear fuel pellets;

an upper tie plate and a lower tie plate holding upper end portions and lower end portions of said fuel rods respectively; and means for fixing a channel box covering said fuel bundle to one corner of said upper tie plate by a channel fastener, a center of said at least one neutron moderator rod being shifted toward said one corner, away from a cross sectional center of the fuel assembly, wherein said plurality of fuel rods include a plurality of short-length fuel rods having a shorter active fuel length than remaining fuel rods, the number of said short-length fuel rods being arranged in one diagonally divided half area opposite to said one corner is larger than that in the other diagonally divided half area.

2. A fuel assembly according to claim 1, wherein the fuel assembly is divided into a first region including said one corner and a second region by a diagonal line in a cross section, and an average uranium enrichment of the fuel rods in said second region is higher than that of the fuel rods in said first region.

* * * * *